(No Model.) 2 Sheets—Sheet 1.

J. H. GREENWOOD.
Planer Chuck.

No. 233,846. Patented Nov. 2, 1880.

Attest.
Sidney P. Hollingsworth
O. R. Stansbury.

Inventor.
John H. Greenwood,
By his Attorneys,
Stansbury & Munn.

N. PETERS, PHOTO-LITHOGRAPHER, WASHINGTON, D. C.

(No Model.) 2 Sheets—Sheet 2.

J. H. GREENWOOD.
Planer Chuck.

No. 233,846. Patented Nov. 2, 1880.

Attest
Sidney P. Hollingworth
P. R. Stansbury.

Inventor.
J. H. Greenwood,
By his Attorneys,
Stansbury & Munn.

UNITED STATES PATENT OFFICE.

JOHN H. GREENWOOD, OF COLUMBUS, OHIO.

PLANER-CHUCK.

SPECIFICATION forming part of Letters Patent No. 233,846, dated November 2, 1880.

Application filed July 1, 1880. (No model.)

*To all whom it may concern:*

Be it known that I, JOHN H. GREENWOOD, of Columbus, in the State of Ohio, have invented certain new and useful Improvements in Planer-Chucks or Work-Holding Devices; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
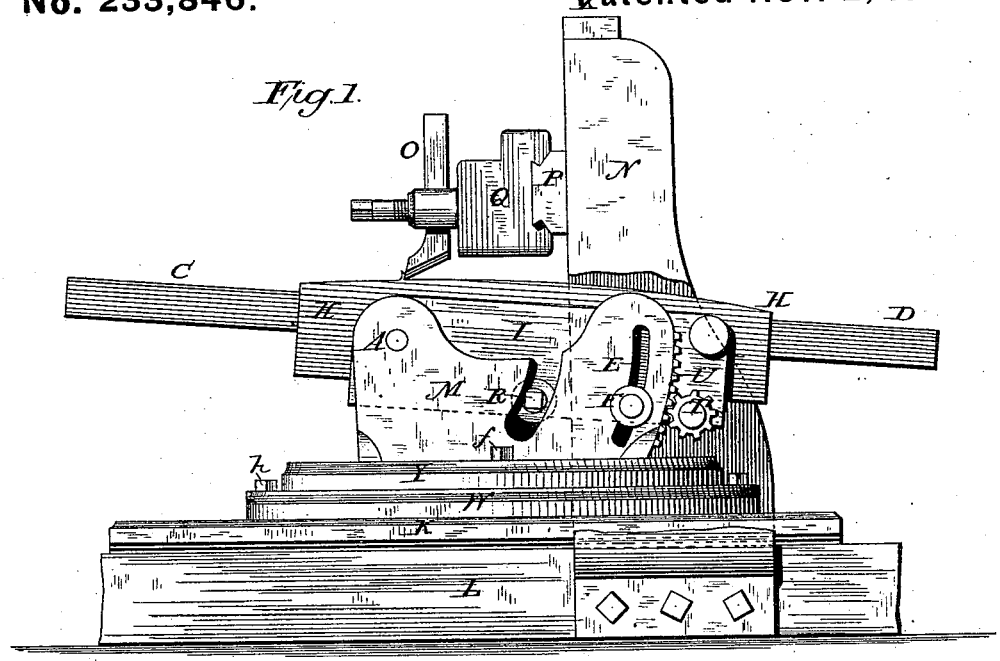
Figure 2:
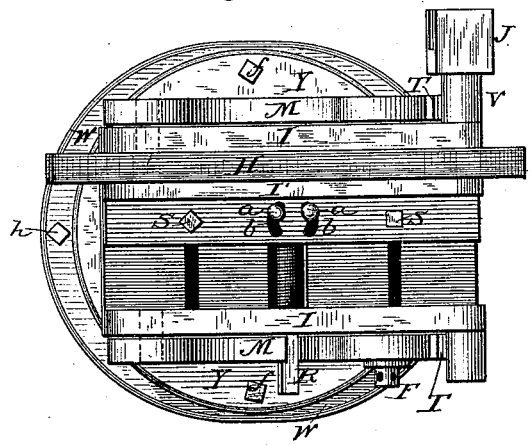
Figure 3:
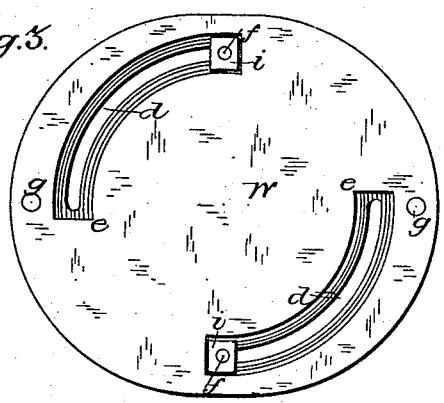
Figure 4:
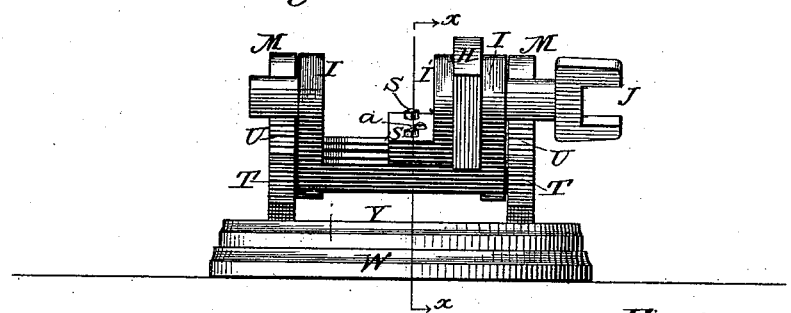
Figure 5:
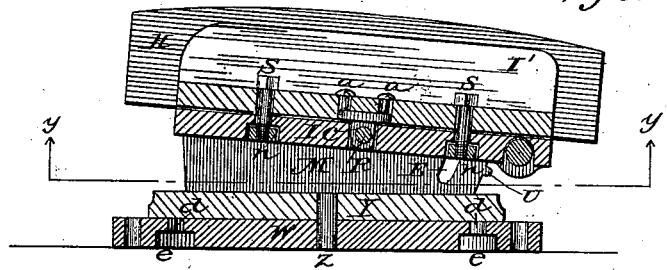
Figure 6:
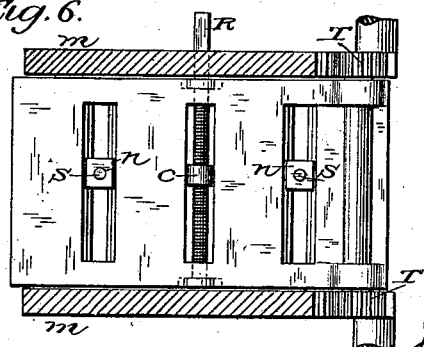

Figure 1 is a side elevation of the machine, part of the side framing being cut away to show the chuck attached to the planer. Fig. 2 is a top or plan view of the chuck detached. Fig. 3 is a bottom view of the chuck, showing the segmental slots for the circular adjustment of the chuck. Fig. 4 is an end view. Fig. 5 is a longitudinal vertical section on line $x$ $x$ of Fig. 4, looking to the right. Fig. 6 is a horizontal section on line $y$ $y$ of Fig. 5, looking upward.

The same letter indicates the same part in all the figures where it occurs.

This invention relates to improvements on the planing-machine chuck for which I filed an application for a patent April 19, 1880; and it consists in devices for giving circular rotation and adjustment to the work-holder, for adapting the clamp to hold work of different shapes, and for securing uniformity of strain on both sides of the work-holder, all substantially in the manner hereinafter more specifically set forth.

In the drawings, L marks the lower frame of the planer; W, the base-plate; N, the side frame, and X and P the cross-framing.

K is the reciprocating bed-plate, on which the chuck is supported. To this bed-plate is attached, by bolts $h$, at $g$, the base W, to the center of which is pivoted, by bolt Z, the circular plate Y, so as to be capable of turning upon it. Plate Y is clamped to plate W by bolts $f$ $f$ and nuts $i$ $i$, the bolts passing into the segmental slots $d$ $d$, and the nuts bearing against shoulders $e$ $e$ on the lower edges of said slots in plate W, as shown in Fig. 3. It results from this construction that the chuck can be turned horizontally a quarter-revolution on the traversing bed-plate, and the work can be presented to the tool at any angle within the limit indicated to the line of cross-feed of the machine.

The chuck is provided with a movable jaw, I', between which and the side I the work H is clamped by means of set-screws S S and adjusting-screw R. The set-screws S S pass through long slots in the bottom of the work-holder and enter clamp-nuts, by which they fix the jaw in position. (See Fig. 6.) The adjusting-screw R passes through a traveling nut, $c$, on the upper side of which is a circular plate or cap, fitting into a circular recess in the bottom of jaw I'. (See Fig. 5.) Said jaw has two slots, $b$ $b$, through which pass screws $a$ $a$, which enter the circular plate on nut $c$. When screws S S and $a$ $a$ are loosened, the jaw I' can be turned horizontally on the cap of nut $c$ as a center, so as to adapt itself readily to the angle of the work it is designed to hold, and hold it firmly, however irregular its form.

The chuck I is hung in its frame M by bolts or pivots at A, and rocks on said pivots as the bed K reciprocates.

To equalize the strain on both sides of the chuck while rocking in its frame, the rear end of the frame on each side is provided with a toothed segmental rack, U, into which mesh two pinions, T, attached at either end of a shaft turning in the rear of the vibrating work-holder.

A cross-head, J, is pivoted to the chuck at V, Fig. 2. It slides on a long guide-bar, C D, which librates on a fulcrum attached to the side of the planer-frame, as described in my former application. The position of the guide-bar C D regulates the radius of the curve which is to be reproduced in the work. If the rear end, D, of the bar is above a horizontal line drawn through A, the curve of the work will be concave; if below, the curve will be convex, and the radius of the curve in either case will depend upon the amount of the obliquity of the bar to a horizontal line, being longest when the obliquity is least, and shortest when the obliquity is greatest.

O is the planing-tool, attached to a sliding head, Q, which traverses on a dovetail on the face of cross-bar P. The sliding bed K moves longitudinally on bed-plate L of the machine, as shown.

E, Fig. 1, is a curved slot in the side of frame M, through which a clamp-screw, F, passes into the side I of the work-holder, for the purpose of fixing the holder at any desired angle with the horizontal to plane work at any incline.

The general operation of the machine is not different from that described in my previous application, except that the horizontal rotary adjustment of the chuck enables the planer to plane angle-work on lines oblique to the line of cross-feed of the machine on either side.

Having thus fully described my improvements, what I claim is—

1. In a planer-chuck, the combination of the segmental rack U U on the side frames, M, with the toothed pinions T T, fixed to the ends of a shaft turning in boxes at the rear of the vibrating work-holder.

2. In a planer-chuck, the jaw I', set-screws S S, adjusting-screw R, nut c, provided with a circular cap, screws a a, and curved slots b b in the bottom of the jaw I', all constructed, arranged, and operating as described.

In testimony that I claim the foregoing as my own invention I affix my signature in presence of two witnesses.

JOHN H. GREENWOOD.

Witnesses:
E. T. HUGHES,
C. B. FUNSTON.